Figure 1:
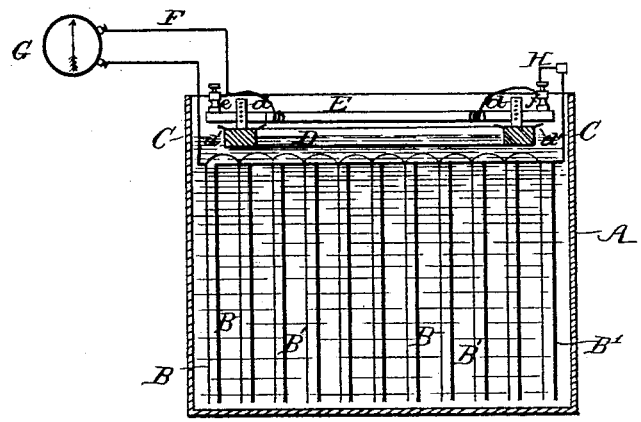

(No Model.) 2 Sheets—Sheet 1.

S. C. C. CURRIE.
INDICATOR FOR SECONDARY BATTERIES.

No. 393,744. Patented Dec. 4, 1888.

Witnesses,
G. Smith.
A. B. Blackwood.

Inventor:
Stanley C. C. Currie.
by Connolly Bros
Attys (No Model.) 2 Sheets—Sheet 2.

S. C. C. CURRIE.
INDICATOR FOR SECONDARY BATTERIES.

No. 393,744. Patented Dec. 4, 1888.

Witnesses.
G. Smith.
A. B. Blackwood.

Inventor.
Stanley C. C. Currie,
by Connolly Bros
Attys.

UNITED STATES PATENT OFFICE.

STANLEY C. C. CURRIE, OF PHILADELPHIA, PENNSYLVANIA, ASSIGNOR TO THE UNITED ELECTRIC IMPROVEMENT COMPANY, OF GLOUCESTER, NEW JERSEY.

INDICATOR FOR SECONDARY BATTERIES.

SPECIFICATION forming part of Letters Patent No. 393,744, dated December 4, 1888.

Application filed January 25, 1888. Serial No. 261,888. (No model.)

*To all whom it may concern:*

Be it known that I, STANLEY C. C. CURRIE, a subject of the Queen of Great Britain, residing at Philadelphia, in the county of Philadelphia and State of Pennsylvania, have invented certain new and useful Improvements in Indicators for Accumulators or Secondary Batteries; and I do hereby declare the following to be a full, clear, and exact description of the invention, reference being had to the accompanying drawings, which form part of this specification.

My invention has relation to indicators for accumulators or secondary batteries, and has for its object the provision of novel means for indicating by a visual or audible electrically-operated signal when a battery is fully charged.

It is known that when an accumulator has received its full charge an ebullition of the fluid therein takes place, due to the fact that the elements of the battery have absorbed all the gas they are capable of receiving, and the gas subsequently generated rises in the form of bubbles and escapes, thereby creating a fine spray or mist upon the surface of the aforesaid fluid. This action is termed "sweating," and is an indication that the battery is fully charged. As the ebullition gradually increases in violence after it has started, the height to which the spray rises above the surface of the fluid also increases, and this increase has been noted and acted upon when it is desired to surcharge the battery after ebullition has commenced.

My invention consists in the provision of novel means for utilizing this ebullition of the fluid contents of the battery to establish an electric circuit through an electrically-operated visual or audible signal, thereby indicating that the battery is charged.

My invention further consists in the novel construction, combination, and arrangement of parts hereinafter described and specifically claimed.

In carrying my invention into effect I arrange in proximity to the surface of the fluid in the battery a strip, rod, bar, or section of a material, either a non-conductor of electricity—such as glass, vulcanite, or india-rubber—or a section or piece of a fibrous material—as a tape, string, or band of wool, or other similar material—or a section of a porous material offering under ordinary circumstances considerable resistance to the passage of an electric current—as carbon or a pair of elements capable under the action of an exciting-fluid of producing an electric current—as, for instance, a piece of copper and a piece of zinc separated by a slip of felt, flannel, paper, or the like—the essential feature of the strip, rod, bar, or section or plural number of such being that it or they shall normally present a high resistance to the passage of an electric current, but when subjected to the action of the spray or moisture arising from an accumulator shall become a good conductor or a generator of electricity, as the case may be. The said strip-section or pair of elements I interpose in an electric circuit containing an electric bell, or an index-hand operated by the passage of an electric current in its vicinity in the manner of a galvanometer, or any other indicating or signaling device capable of being electrically operated. As soon as the accumulator or secondary battery to which the above-described device is applied becomes charged the ebullition of the fluid of the same generates a spray or mist, which settles upon or is absorbed into the resistance strip or section, and, as the fluid in such batteries is acidulated water, provides a path through or upon the surface of the same for the passage of an electric current, which thereupon operates the indicator.

The current for the operation of the indicator may be taken from the battery being charged, or may be taken from a local battery, or may, as before mentioned, be generated by the action of the moisture upon two elements which may form the resistance strip or section.

While my invention is perfectly adapted to be applied to a single cell or battery, I propose in practice generally to apply it to a number of cells, arranging the non-conductor or resistance strips or sections of the several cells in series and connecting the terminal strips or sections to a single indicating device, so that all the batteries in the set so arranged must be fully charged before the indicator will act.

As it is generally desirable to charge an accumulator or secondary battery for a further period after the point has been reached where the ebullition begins, and, as has before been noted, the height to which the spray rises increases as the cell is overcharged, I am enabled by altering the height of the non-conducting or resistance strips or sections above the fluid of the accumulator, or by altering the size or shape of the same, or by increasing the electro-motive force of the indicator-operating current, to readily predetermine and regulate the amount of overcharge which the battery is to receive.

As the amount of liquid in the accumulator-cells is apt to vary, I deem it advisable to mount the non-conducting or resistance strips or sections adjustably upon a float that will rest upon the surface of the fluid in the battery, so that any change in the amount of fluid in the battery will not affect the relative position of the said strip or section.

Figure 2:
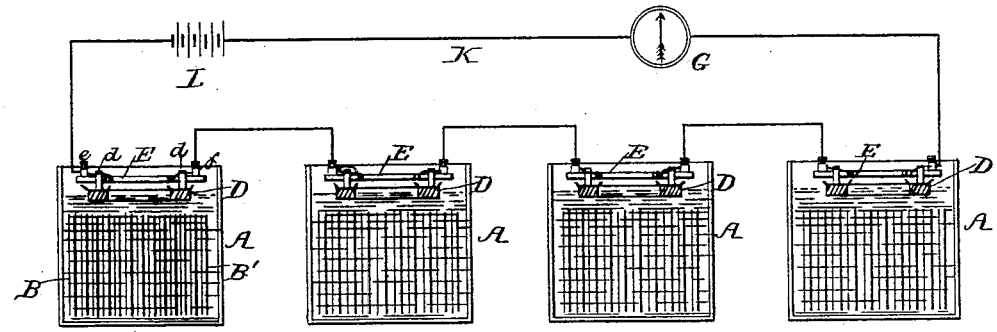
Figure 3:
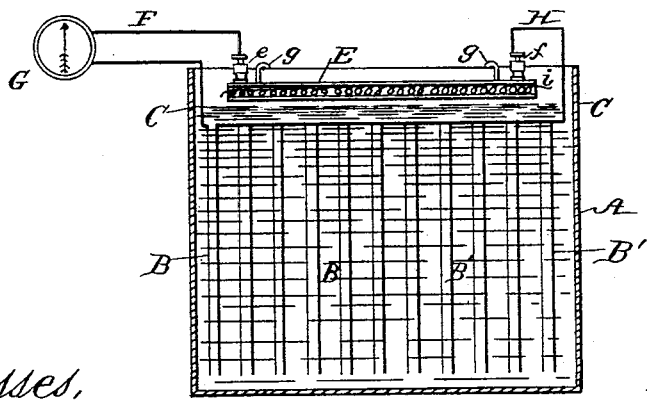

Referring to the accompanying drawings, Figure 1 is a vertical sectional view of a secondary battery or accumulator of the ordinary type having my improvements applied. Fig. 2 is a vertical sectional view of a number of such batteries with the non-conducting or resistance strips or sections of the indicator appliance arranged in series; Fig. 3, a vertical sectional view of a battery with a modified form of resistance or non-conducting strip or section; and Fig. 4, a plan view of an accumulator having my improved indicating device in position thereon, the latter being shown with a resistance strip or section consisting of two metallic elements insulated from one another by an interposed piece of fibrous material.

A designates the outer casing of the battery, B B' the metallic plates or elements thereof, and C C the surface of the fluid in the same.

D designates a float arranged in the battery and supported upon the fluid of the same, and E, Figs. 1, 2, and 3, a strip or section of glass, india-rubber, wood, carbon, or other non-conducting or high-resistance material supported by and adjustable upon uprights $d\ d$, rising from said float. Suitable shields, $d'\ d'$, surround the standards $d\ d$, so as to prevent the deposit of moisture upon the strips or sections E immediately adjoining said standards. The strip or section E is connected by a wire, $e$, with one terminal of an electric circuit, F, in which is interposed an indicating device, G, and which connects with the plates B of the battery A, and the other end of said section E E is connected by a wire, $f$, to a conductor, H, leading from plates B'.

As shown in Fig. 2, where several of the strips or section E are shown in position in as many batteries A A A, it will be observed that the strips or sections E are in series upon an electric circuit, K, in which is interposed a single indicator and a local battery, L. In this case all the sections E must become coated with moisture before the indicator will act.

In Fig. 3 the strip or section E is shown as being suspended from the edge of the battery by hooks $g\ g$, the float D being dispensed with. In this figure the strip or section E is shown as being hollow and containing a spiral wire, $i$, and by passing an electric current through this wire, so as to heat the same, I am enabled to almost immediately disperse the moisture from the surface of the strip E after it has been in action, thereby rendering it fit for immediate application to another accumulator or another charge-indication.

Figure 4:
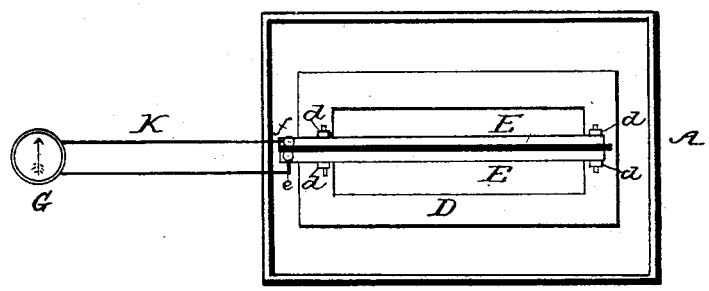

In Fig. 4 the resistance-section is composed of two elements, which may be, for instance, copper and zinc, separated by a strip of porous material—as felt or paper—and one of said elements is connected to one terminal of the electric circuit K, while the other element is connected to the other terminal of the same circuit. It is to be noted that with this arrangement the current for the operation of the indicator is furnished by the metallic elements, which, when the ebullition of the fluid in the accumulator takes place, are acted upon by the exciting moisture deposited and become a battery, thus dispensing with the necessity of employing a local battery or other source of electric supply.

Operation: The parts, being constructed and arranged as above described, operate as follows: When the accumulator has become charged and ebullition of the fluid begins, the spray thrown up by the escaping bubbles of gas moistens the surface of the strip or section E, and serves to conduct the electric current between its terminals $e\ f$, whereupon the indicator is set in operation and serves to notify the overseer that the battery is fully charged. The adjustability of the strip or section E renders it possible to determine the extent of time the battery is to be subjected to surplus charging after ebullition has begun.

The device shown in Fig. 4 operates in substantially the same manner as that shown in Figs. 1, 2, and 3—that is to say, the moisture from the fluid of the accumulator forms the medium of electric connection between the previously-insulated terminals of the electric circuit; but in this case the necessity of an outside source of electric supply for the indicator-circuit is dispensed with, as the elements of the resistance-section when moistened generate sufficient current to work the indicator.

Having fully described my invention, I claim—

1. In an accumulator-indicator, the combination, with an accumulator or secondary battery containing a fluid, an electric circuit normally incomplete, and an indicating device in said circuit, of one or more strips or sections of material interposed in said electric circuit and arranged in proximity to the surface of the said fluid, whereby ebullition of the latter will cause a deposit of moisture upon the said material and complete said circuit, substantially as and for the purpose described.

2. In an accumulator or secondary-battery indicator, the combination, with a battery of that class containing a fluid, of a normally-incomplete electric circuit, an indicating device in said circuit, and terminal points or pieces normally electrically disconnected and adjustably supported above the fluid in the said battery, substantially as and for the purpose described.

3. In an indicator for accumulators or secondary batteries, the combination, with a battery of that class containing a conducting-fluid and a float resting on said fluid, of an electric circuit containing an indicating device and having terminal points normally electrically disconnected, the latter being supported upon said float, substantially as described.

4. In an indicator for accumulators or secondary batteries, the combination of an electric circuit and an indicator interposed in said circuit, with terminal points normally electrically disconnected, and also interposed in said circuit, and a coil of wire arranged in the vicinity of said terminal points and adapted to be heated for the purpose of evaporating moisture from the same when desired, substantially as described.

5. In an indicator for accumulators or secondary batteries, the combination, with a plural number of such batteries, an electric circuit, and an indicating device arranged in said circuit, of a plural number of pairs of terminal points normally electrically disconnected, arranged in series in said circuit, and each said pair of terminals being appropriated to a different battery-cell, whereby all the latter must be charged before said indicator will be brought into action, substantially as described.

In testimony that I claim the foregoing I have hereunto set my hand this 19th day of January, 1888.

STANLEY C. C. CURRIE.

Witnesses:
 JOS. B. CONNOLLY,
 R. DALE SPARHAWK.